UNITED STATES PATENT OFFICE.

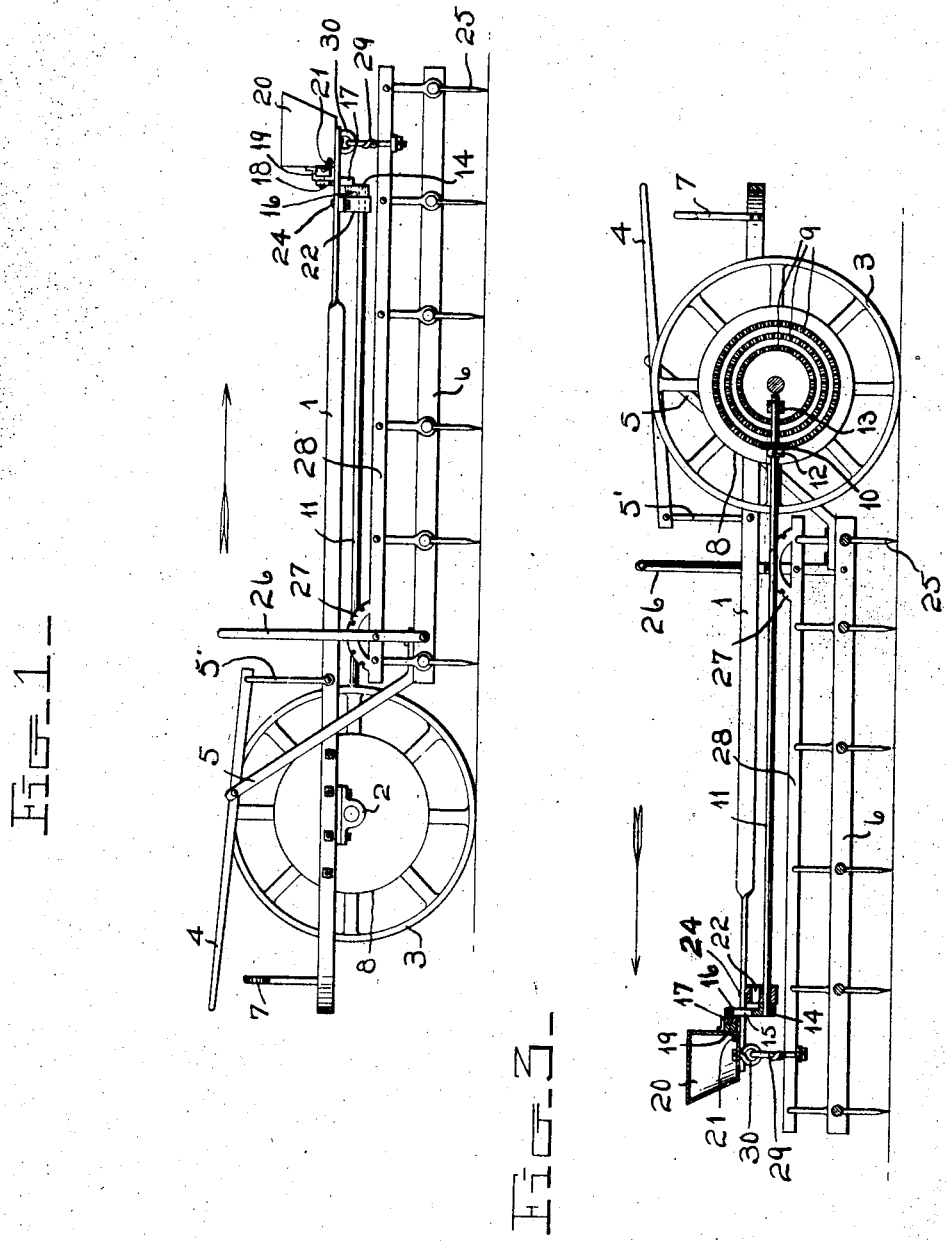

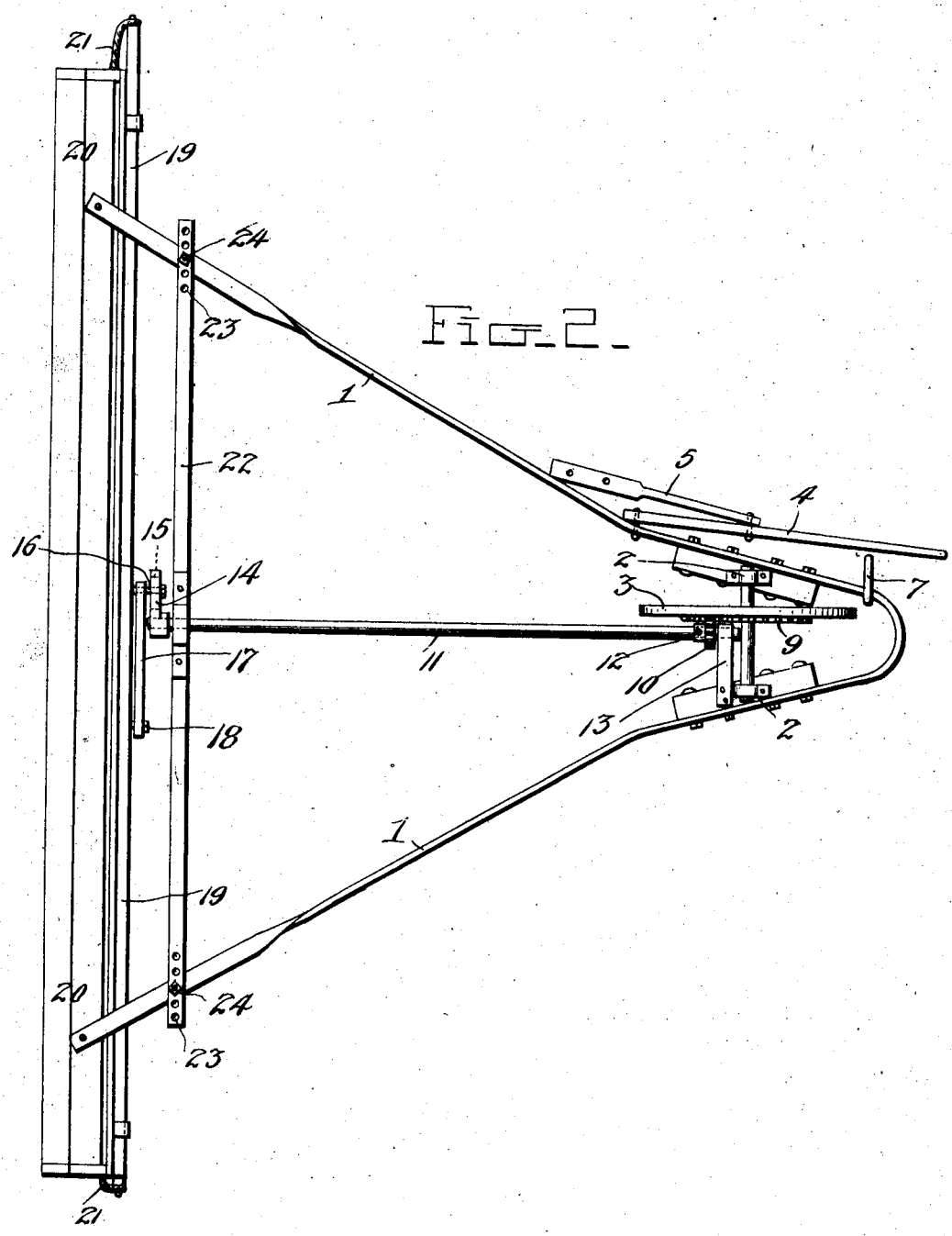

WILLIAM T. DAVIS AND GEORGE B. DAVIS, OF HIAWATHA, KANSAS.

GRASS-SEEDER.

No. 834,458.　　　　Specification of Letters Patent.　　　Patented Oct. 30, 1906.

Application filed June 21, 1906. Serial No. 322,760.

*To all whom it may concern:*

Be it known that we, WILLIAM T. DAVIS and GEORGE B. DAVIS, citizens of the United States, residing at Hiawatha, in the county of Brown and State of Kansas, have invented certain new and useful Improvements in Grass-Seeders; and we do declare the following to be a full, clear, and exact description of the invention, such as will enable others skilled in the art to which it appertains to make and use the same.

This invention relates to improvements in grass-seeders; and one of the principal objects of the same is to provide a machine of comparatively simple construction adapted to be connected to a harrow for sowing the seed immediately in front of the harrow.

Another object is to provide a machine of this character with means for regulating the quantity of seed it is desired to feed by simple mechanism.

These and other objects are attained by means of the construction illustrated in the accompanying drawings, in which—

Figure 1 is a side elevation of a grass-seeder made in accordance with our invention. Fig. 2 is an under side plan view of the same, and Fig. 3 is a longitudinal section of the same.

Referring to the drawings for a more particular description of our invention, the numeral 1 designates the diverging side bars of the approximately U-shaped seeder-frame, said bars passing around a wheel 3 and provided with suitable bearings 2 for said wheel 3. A lever 4 is pivoted intermediately of its ends to the upper end of a support 5, the lower end of said support being rigidly secured upon the frame of a harrow 6, the purpose of said lever being to raise the drive-wheel 3 off the ground while turning. The inner end of said lever 4 is connected with one of the bars 1 by a link 5'. A suitable hook 7, formed on the upper end of a rod secured to one of the frame-bars 1 of the seeder, serves as a means for holding the lever in position to support the wheel 3 above the ground. Formed on the hub 8 of the wheel 3 are three rows of cogs 9, and a pinion 10 upon a longitudinal shaft 11 is adjustable to engage either of the series of cogs to change the speed of the feeding device. The pinion is mounted to slide upon the shaft, and a pin 12 secures the pinion in place. The longitudinal shaft 11 is supported at one end upon a bracket 13 and at its opposite end is provided with a right-angularly-extending crank-arm 14, provided with a slot 15, and secured in said slot is a wrist-pin 16 of a connecting rod or pitman 17, the opposite end of which is connected by a pin 18 to a reciprocating bar or shaker 19. The wrist-pin 16 is adjustable in said slot to give the pitman 17 a longer or shorter throw to regulate the amount of seed sown. The seedbox 20 is provided with any well-known feeding devices and dropping-apertures adapted to be operated by means of a reciprocating rope 21. This feeding device forms no part of the present invention and need not be specially described.

Our grass-seeder is shown connected to an ordinary harrow. A cross-bar 22, provided with a series of apertures 23, extends across the frame and is secured adjustably to the bars 1 by the bolts 24. The inclination of the harrow-teeth 25 is adjusted by means of the lever 26, held in place by the rack 27. The seedbox is connected to the bar 28 by means of the eyebolts 29. When it is desired to change the feed, the pinion 10 is moved upon the shaft 11, and the slotted arm 14 is thus adapted to be rotated at a greater or less speed.

Various changes in the form, proportion, and the minor details of construction may be resorted to without departing from the principle or sacrificing any of the advantages of this invention as defined by the appended claims.

Having thus described our invention, what we claim as new, and desire to secure by Letters Patent, is—

1. A seeder attachment for harrows comprising a frame adapted to be secured to a harrow-frame, a wheel journaled in said seeder-frame and provided with a hub having a series of concentrically-arranged cogs, a longitudinal shaft having a pinion slidably mounted thereon, said shaft having at its opposite end a slotted crank-arm, a pitman connected to said arm, and attached to a reciprocating bar for actuating the feed of the seeder, and means for raising said wheel out of contact with the ground to throw the seeder out of operation when desired.

2. In a seeder attachment for harrows, the combination of a seedbox having eyebolts projecting through the bottom thereof, eye-clamps engaging said eyebolts and clamped to the front of the harrow-frame, a frame connected with said seedbox and extending to the rear of said harrow, a drive-wheel mounted in said frame, a seed-dropper for said box, and means connected with said wheel for actuating said dropper.

3. The combination of a frame, a wheel mounted therein, a harrow connected with said frame, a seedbox mounted on said harrow, means for regulating the quantity of seed to be dropped, a lifting-lever pivotally mounted on the harrow-frame, and connected at one end with the wheel-carrying frame, and means for locking said lever to hold the wheel out of contact with the ground in turning and thus stop the operation of the seeder.

4. The combination of a frame, a wheel mounted therein, a harrow connected with said frame, a seedbox mounted on said harrow, means for regulating the quantity of seed to be dropped, an upright rigidly secured to the harrow-frame, a lever pivotally mounted on said upright intermediate of its ends, a link connecting the inner end of said lever to the wheel-frame, and a hook carried by said wheel-frame for engaging the free end of said lever to hold the wheel-frame in raised position to throw the seeder out of operation.

In testimony whereof we have hereunto set our hands in presence of two subscribing witnesses.

WILLIAM T. DAVIS.
GEORGE B. DAVIS.

Witnesses:
F. H. SMITH,
C. D. LAMME.